(12) United States Patent
Feichtinger et al.

(10) Patent No.: US 8,617,675 B2
(45) Date of Patent: *Dec. 31, 2013

(54) FUEL TANK ATTACHMENT AND METHOD FOR PRODUCING A FUEL TANK ATTACHMENT

(75) Inventors: Reinhard Feichtinger, Pleinfeld-Ramsberg (DE); Simon Amesöder, Gunzenhausen (DE)

(73) Assignee: Reinhard Feichtinger, Pleinfeld-Ramsberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/004,348

(22) Filed: Jan. 11, 2011

(65) Prior Publication Data

US 2011/0139778 A1 Jun. 16, 2011

Related U.S. Application Data

(63) Continuation-in-part of application No. PCT/EP2010/068729, filed on Dec. 2, 2010.

(30) Foreign Application Priority Data

Dec. 15, 2009 (DE) ............ 20 2009 016 927 U (51) Int. Cl.
*B29D 22/00* (2006.01)
(52) U.S. Cl.
USPC ........... 428/35.7; 220/86.1; 525/66; 525/179; 525/184; 156/245

(58) Field of Classification Search
USPC ........ 428/35.7, 36.91; 220/86.1; 525/66, 179, 525/184; 156/245
See application file for complete search history.

(56) References Cited

U.S. PATENT DOCUMENTS

| 3,880,953 A | 4/1975 | Downey |
| 4,123,582 A | 10/1978 | Musyt |
| 4,611,031 A | 9/1986 | Galluccio et al. |

(Continued)

FOREIGN PATENT DOCUMENTS

| DE | 19535413 C1 | 10/1996 |
| DE | 10062997 A1 | 7/2002 |

(Continued)

OTHER PUBLICATIONS

Office Action of related U.S. Appl. No. 12/530,967, dated Apr. 26, 2012.

(Continued)

*Primary Examiner* — N. Edwards
(74) *Attorney, Agent, or Firm* — Matthew B. Dernier, Esq.; Gibson & Dernier LLP (57) ABSTRACT

Fuel tank attachment, composed of a blend of a first plastic and a second plastic, wherein the first and second plastics are not miscible, wherein the blend contains a compatibilizer to render the first and second plastics miscible, wherein the first plastic is a fuel-resistant plastic, and wherein the second plastic is a non-fuel-resistant plastic, wherein the fuel tank attachment relates to a neck fitting, in particular, to a filler neck or a valve, in particular, a tank venting valve, or a cap element, wherein the fuel tank attachment is molded from a blend as one piece.

22 Claims, 4 Drawing Sheets

(56) References Cited

U.S. PATENT DOCUMENTS

| | | | |
|---|---|---|---|
| 5,129,544 A | 7/1992 | Jacobson et al. | |
| 5,314,733 A | 5/1994 | Saito et al. | |
| 5,612,101 A | 3/1997 | Furuta et al. | |
| 5,928,745 A | 7/1999 | Wood et al. | |
| 6,033,749 A | 3/2000 | Hata et al. | |
| 6,117,561 A * | 9/2000 | Jacquemet et al. | 428/475.5 |
| 6,218,024 B1 | 4/2001 | Tamber et al. | |
| 6,235,837 B1 * | 5/2001 | Basset et al. | 525/66 |
| 6,265,690 B1 | 7/2001 | Förnsel et al. | |
| 6,300,417 B1 | 10/2001 | Sue et al. | |
| 6,379,791 B1 | 4/2002 | Cernohous et al. | |
| 6,391,412 B1 | 5/2002 | Hata et al. | |
| 6,395,357 B1 | 5/2002 | Abu-Isa | |
| 6,398,059 B1 | 6/2002 | Hayashi et al. | |
| 6,423,779 B2 | 7/2002 | Sue et al. | |
| 6,559,234 B1 | 5/2003 | Arai et al. | |
| 6,630,239 B2 | 10/2003 | Cernohous et al. | |
| 6,719,163 B1 | 4/2004 | Delbarre et al. | |
| 6,737,132 B1 | 5/2004 | Michihata et al. | |
| 6,843,267 B1 | 1/2005 | Van Schaftingen et al. | |
| 6,884,482 B2 | 4/2005 | Hayashi et al. | |
| 6,887,581 B2 | 5/2005 | Tamura et al. | |
| 6,989,198 B2 | 1/2006 | Masuda et al. | |
| 7,208,210 B2 | 4/2007 | Michihata et al. | |
| 7,211,307 B2 | 5/2007 | Potter et al. | |
| 7,278,439 B2 | 10/2007 | Gerard et al. | |
| 7,473,451 B2 | 1/2009 | Michihata et al. | |
| 7,584,864 B2 | 9/2009 | Yamamoto et al. | |
| 7,648,771 B2 | 1/2010 | Day et al. | |
| 7,771,805 B1 | 8/2010 | Negandhi et al. | |
| 7,807,006 B2 | 10/2010 | Dubois et al. | |
| 7,810,666 B2 | 10/2010 | Borchert et al. | |
| 8,062,725 B2 | 11/2011 | Zhu et al. | |
| 8,475,614 B2 * | 7/2013 | Criel et al. | 156/92 |
| 2001/0045433 A1 | 11/2001 | Ellis | |
| 2002/0051856 A1 | 5/2002 | Delbarre | |
| 2002/0132925 A1 | 9/2002 | Cernohous et al. | |
| 2002/0176955 A1 | 11/2002 | Hayashi et al. | |
| 2002/0197495 A1 | 12/2002 | Tamura et al. | |
| 2003/0008090 A1 * | 1/2003 | Rohde et al. | 428/35.7 |
| 2003/0044553 A1 | 3/2003 | Ramanathan et al. | |
| 2003/0124281 A1 * | 7/2003 | Ries et al. | 428/35.7 |
| 2003/0198768 A1 | 10/2003 | Delbarre | |
| 2003/0209550 A1 | 11/2003 | Potter et al. | |
| 2004/0009315 A1 | 1/2004 | Potter et al. | |
| 2004/0092409 A1 | 5/2004 | Liesen | |
| 2004/0126523 A1 | 7/2004 | Masuda et al. | |
| 2004/0170786 A1 | 9/2004 | Michihata et al. | |
| 2004/0170787 A1 | 9/2004 | Michihata et al. | |
| 2004/0220337 A1 | 11/2004 | Tsutsumi et al. | |
| 2004/0256587 A1 | 12/2004 | Gerard et al. | |
| 2005/0112312 A1 | 5/2005 | Baumert et al. | |
| 2005/0269333 A1 | 12/2005 | Burrington et al. | |
| 2006/0099365 A1 | 5/2006 | Sasai et al. | |
| 2006/0099367 A1 | 5/2006 | Nakamura et al. | |
| 2006/0116474 A1 | 6/2006 | Jarus et al. | |
| 2007/0029329 A1 | 2/2007 | Dubois et al. | |
| 2007/0065612 A1 | 3/2007 | Yamamoto et al. | |
| 2007/0181582 A1 | 8/2007 | Gerard et al. | |
| 2007/0255007 A1 * | 11/2007 | Dean | 525/178 |
| 2008/0135562 A1 | 6/2008 | Miyajima | |
| 2010/0139842 A1 * | 6/2010 | Criel et al. | 156/92 |
| 2010/0282746 A1 | 11/2010 | Negandhi et al. | |
| 2011/0027510 A1 * | 2/2011 | Lee et al. | 428/35.7 |
| 2011/0056966 A1 * | 3/2011 | Feichtinger et al. | 220/694 |
| 2011/0060079 A1 | 3/2011 | Kim et al. | |
| 2011/0139778 A1 * | 6/2011 | Feichtinger et al. | 220/86.1 |
| 2011/0139788 A1 | 6/2011 | Li | |
| 2011/0151165 A1 | 6/2011 | Zhu et al. | |

FOREIGN PATENT DOCUMENTS

| | | |
|---|---|---|
| DE | 10223865 A1 | 12/2003 |
| EP | 0986939 B1 | 3/2000 |
| EP | 1108653 A1 | 6/2001 |
| WO | 2007029942 A1 | 3/2007 |
| WO | 2008113821 A1 | 9/2008 |

OTHER PUBLICATIONS

Related U.S. Appl. No. 12/530,967, Sep. 9, 2009.
Office Action of related U.S. Appl. No. 12/530,967, dated Oct. 26, 2012.
International Preliminary Report on Patentability for related PCT application PCT/EP2008/053288, Apr. 7, 2009.
International Search Report for related PCT application PCT/EP2008/053288, Jul. 10, 2008.

* cited by examiner

FUEL TANK ATTACHMENT AND METHOD FOR PRODUCING A FUEL TANK ATTACHMENT

CROSS-REFERENCE TO RELATED APPLICATIONS

This application is a continuation-in-part application of PCT/EP2010/068729, filed Dec. 2, 2010, which claims priority to DE 202009016927.8, filed Dec. 15, 2009, the entire disclosures of which are hereby incorporated by reference.

BACKGROUND

The invention relates to a fuel tank attachment, a fuel tank, in particular, a motor-vehicle fuel tank, and to a method for producing a fuel tank attachment.

US 2006 099 365 A1 discloses an attachment that has a first and a second region. Both the first and second regions have the same non-miscible blend of a fuel-resistant ethylene vinyl alcohol copolymer, a non-fuel-resistant HDPE, and an HDPE-based grafted compatibilizer.

EP 1 108 653 A2 discloses a fuel tank comprising a container region composed of HDPE and an attachment composed of a non-miscible blend of fuel-resistant plastic, e.g., polyamide, HDPE, and a compatibilizer.

US 2003/0124281 A1 also discloses an attachment. It has an injection-molded connection nipple composed of a glass-filled polyamide that is attached to a coextruded film composed of a polyamide, a functionalized polyethylene, and a high-density polyethylene. The element thus created is welded onto a single-layer or multi-layer tank composed primarily of HDPE. This approach allows only a fluid-tight or vapor-conducting system to be created that has a joining zone composed of a coextruded multi-layer structure.

DE 195 35 413 C1 discloses a component that is composed of a tubular thermoplastic body that has a stepped annular body at one end and a retaining ridge at the opposite end. Opposite the inner diameter of the body, a circular ring with a projection is molded on, offset by the wall thickness of the body. An intermediate layer functioning as an adhesion promoter is incorporated in the stepped annular body. Under this, an annular body element is molded on enclosing the ring with the projection. When heated, the annular body element, intermediate layer, and circular ring of the tubular body are joined to each other, in addition to the mechanical connection that is effected by the circular projection.

Since this type of attachment does not withstand swelling by the plastics, the plastic of the annular body element, according to DE 100 62 997 A1, is cross-linked in such a way that a chemical bond is created between the plastics of both parts by means of bridging across the interface between the parts. At its end pointing towards the tank, the tubular body is divided into an inner tubular body and an outer tubular body.

WO 2008/113821 A1, which the invention uses as a starting point as the closest prior art, discloses a fuel tank attachment that has a first region that is composed of a first plastic, and a second region, wherein the second region has a blend of the first plastic and a second plastic, wherein the first and second regions are integrally bonded together. The fact that the second region is composed of a blend provides an integral bond between the fuel tank attachment and an outer wall of a fuel tank, the outer wall being composed of the second plastic. The disadvantageous aspect in particular here is the technical cost of fabrication to produce this type of fuel tank attachment, since this has two different regions that are composed of different plastics or plastic blends which have to be integrally bonded to each other so as to first provide the possibility of creating the integral bond with the fuel tank.

SUMMARY

In contrast to the above, the object of the invention is to create an improved fuel tank attachment and method for producing it, as well as a fuel tank system.

The objects of the invention are achieved respectively by the features of the embodiments disclosed and described herein. Other embodiments of the invention are also provided as to further features and objects.

Embodiments of the invention in particular have the advantage that the fuel tank attachment can be produced cost-effectively and can be attached to the fuel tank in an operationally reliable manner.

What is meant here by "fuel tank attachment" are all those components that are suitable for installation on a fuel tank, in particular, neck fittings, valves, in particular, tank venting valves, closing elements, or the like.

The first plastic relates to a fuel-resistant plastic. What is meant by the term "fuel-resistant plastic" is one that does not swell, or swells only slightly, and has no or only low permeability for fuel or oil whenever it is exposed to a fuel or oil over an extended period of time. The term "fuel-resistant plastic" refers in particular here to a plastic that complies with the Lev II and PZEV standards in regard to emissions.

A possible first fuel-resistant plastic can, for example, be polyamide (PA), in particular, PA 12, or polyoxymethylene (POM). However, the first plastic can also be another fuel-resistant thermoplastic or a fuel-resistant blend of compatible plastics.

The second plastic is a non-fuel-resistant plastic.

What is meant by a "non-fuel-resistant" here is a plastic that swells or is otherwise significantly modified in terms of its dimensions or mechanical properties whenever it comes into contact with fuel for an extended period of time, or one that is not fluid-tight relative to fuel or oil. For example, this second non-fuel-resistant plastic can be polyethylene (PE) or polypropylene (PP). However, the second plastic can also be another non-fuel-resistant thermoplastic or a blend of compatible plastics that are not fuel-resistant.

The first and second plastic are not miscible per se. The blend therefore contains a compatibilizer so as to make the first and second plastics miscible.

Embodiments of the invention are in particular advantageous in reducing the cost of the fuel tank attachment. This is because generally the first fuel-resistant plastic is significantly more expensive than the second non-fuel-resistant plastic. Since, however, the first and second plastics are not miscible, and thus normally no integral fluid-tight bond can be created between the two plastics, in the prior art the fuel tank attachment will be primarily composed only of the first plastic, which approach is accordingly expensive.

As set forth in WO 2008/113821, those regions of the fuel tank attachment are fabricated from the first plastic which are exposed to the fuel in normal operation, i.e., after being installed on a fuel tank and the fuel tank has been filled with fuel, whereas one or more regions that are normally not exposed, or not directly exposed, to the fuel are fabricated from the blend that has only a certain proportion of the first plastic so as to provide the integral bond with the first regions.

The present inventions departs from this approach by following an approach in which not only a single region, which is required for the integral bond with the fuel tank, but preferably the entire fuel tank attachment is fabricated from the blend of the first and second plastics—such as, for example, using a 1-component plastic injection molding process, by an extrusion process, or other molding process.

This approach eliminates the need to produce an integral bond between the first plastic and the blend, such as, for example, using a relatively costly 2-component injection molding process. Instead, the fuel tank attachment can be fabricated using a 1-component plastic injection molding process by injecting the plasticized blend of the first and second plastics, and the compatibilizer, into a mold. In addition, this provides sufficient fuel resistance on the part of the fuel tank attachment, which surprisingly achieves this due to the first plastic present in the blend. As a result, the invention enables, first of all, the production-equipment-related cost for producing the fuel tank attachment to be reduced, although it still significantly economizes on the volume of material in terms of the first plastic since this is partially replaced by the second plastic, while secondly the invention surprisingly still provides sufficient resistance to fuel, even in long-term operation.

In addition, embodiments of the invention also have mechanical advantages:

In one embodiment of the invention, the compatibilizer is a copolymer of the first and second plastics. The use of this compatibilizer has in particular the advantage that it is not necessary to incorporate any further additional material different from the first and second plastics into the blend. This is because such an additional material could be problematic in terms of its impermeability and long-term durability.

In one embodiment of the invention, the polymer involves a "graft copolymer." What is meant by a "graft copolymer is a copolymer that is produced as follows: To produce the graft copolymer, one of the first and second plastics is grafted such that the grafted plastic can then enter into covalent bonds with the other of the two plastics. The grafting of the plastic is effected, for example, with a reactive group, such as, for example, a maleic anhydride or an acetic acid group. The copolymer then acts as an emulsifier in the blend of the first and second plastics.

In one embodiment of the invention, the copolymer is produced by means of an additional compatibilizer that is added in solid or liquid form to a blend of the first and second plastics, and is at least partially consumed during copolymerization. The additional compatibilizer her reacts both with the first as well as the second plastic.

In one embodiment of the invention, the additional compatibilizer contains reactive isocyanate groups and/or oligomers with epoxide groups and/or (maleic-acid) anhydride groups or oxazoline groups.

In one embodiment of the invention, the proportion of the first plastic in the blend is smaller than the proportion of the second plastic. For example, the proportion of the first plastic can be a maximum of 35 wt. %, in particular between 20 wt. % and 30 wt. %

In one embodiment of the invention, the fuel tank attachment is designed at least in a first region to be integrally bonded with a second region, where the second region is located on an outer wall of a fuel tank. For example, the second region is composed of the second plastic, with the result that the integral bond is able to be created due to the presence of the second plastic in the blend.

The advantages achievable with embodiments of the invention consist in particular in the fact that the first and second regions are attached to each other directly. The first region is thereby enhanced so as to be fuel-resistant and at the same time attachable. The attachment here involves an integral bond. For the fuel tank attachments, this means that they can be pre-fabricated in any quantity desired and welded to the tank without transition pieces. In addition, use of the non-fuel-resistant significantly reduces the cost of producing the fuel tank attachment. The blend used, and thus the fuel tank attachment, become less and less inexpensive as the proportion of non-fuel-resistant plastic increases.

The blend can contain at least
10 to 85 wt. % of the first fuel-resistant plastic;
85 to 10 wt. % of the second non-fuel-resistant plastic;
3 to 15 wt. % of the compatibilizer; and
approximately 5 to 30 wt. % in additives.
The blend can advantageously be composed of
approximately 45 wt. % of the first fuel-resistant plastic;
approximately 45 wt. % of the second non-fuel-resistant plastic;
approximately 10 wt. % of the compatibilizer, additives, and fillers.

The terms "approximately" here is understood, for example, to refer to ±5% of the value indicated.

The first plastic can be a polyamide, and the second plastic can be a polyethylene.

The polyamide used can be PA6, PA66, PA11, PA12, PA6-T, in other words, the entire range of polyamides. The entire range of polyethylenes can also be employed.

The compatibilizer can be a copolymer of the first and of the second plastic.

The copolymer can be a reactively generated copolymer. The copolymer can furthermore have an additional compatibilizer.

The additives can be stamped metal filters, flame retardants, impact-resistance modifiers, antistatic agents, conductivity additives, and the like.

The fillers can be glass fibers, glass beads, mineral substances, or the like.

In order to effect a connection to a tank composed primarily of polyethylene,
a tubular body element can be provided including annular body element disposed thereon;
where the tubular body element and the annular body element can be produced from the blend as one piece, thereby enabling the copolymer annular body element to be attached by a surface element to the outer wall of the fuel tank.

The copolymer annular element can be disposed at a distance from the tubular outlet opening of the tubular body element. This allows the fuel to be kept away from the welded area.

An inside diameter of the tubular body element can be greater than a diameter of the opening of the tank.

The tubular body element can have at least one circular retaining ridge.

The fuel tank attachment can, for example, perform a function such as a neck fitting, tank venting valve, closing element, or the like.

In one embodiment of the invention, a layer can be applied, at least in part, to at least one surface element of the copolymer—flange body, i.e. the second component. This layer additionally reinforces the effective adhesion properties. The layer can thus be applied to the complete surface element or only on a spot basis. Even a layer applied on a spot basis ensures the effectiveness of the adhesion properties. This layer can have a thickness of between approximately 0.001 µm and 100 µm.

This layer can be implemented, for example, by plasma coating, such as that known, for example, from DE 102 23 865 A1. The plasma coating can be effected on one joining surface of the copolymer—flange body with a chemically active layer, wherein the layer can comprise, for example, low-molecular-weight polymer fragments.

The copolymer—flange body can be composed of approximately 10 to 85 wt. % polyamide and approximately 85 to 10 wt. % polyethylene, as well as approximately 5 wt. % additives. In particular, an equal ratio of polyamide to polyethylene is possible. How the proportions are distributed depends on the specific application conditions. However, it is also possible for the flange layers to be composed of layers having different mixing ratios.

A polyethylene flange body can be composed of up to approximately 95 wt. % of one polyethylene and approximately 5 wt. % additives. These standard additives can be stabilizers, lubricants, dyes, metal filters, metallic pigments, stamped metal filters, flame retardants, impact-resistance modifiers, antistatic agents, conductivity additives, and the like.

The inner diameter of the flange body can be greater than a diameter of the opening of the tank. This approach enables the attachment region to be at least partially removed from the area of influence of the fuel and its vapors, thereby counteracting the swelling forces.

A first tubular body element can then terminate in a connection unit at the end facing away from the tank. By using this type of tubular body element, the component can be employed as a neck fitting.

At the end facing away from the tank, a second tubular body element can be closed by a cap element. In this form, this type of component can be used as a closure element for non-required openings of the tank.

At least one connecting tubular element can be disposed below the cap element of the second tubular body element. This provides a housing for a tank venting valve into which a valve element can be inserted.

The connection unit and/or the connecting tubular element can terminate in at least one circular connection ridge. This enables a hose to be connected.

In another aspect, the invention relates to a fuel tank, in particular, a motor-vehicle fuel tank, such as, for example, a fuel tank for an automobile. The fuel tank has an opening and an outer wall that can be composed of the second plastic. The fuel tank attachment is, for example, passed partially through the opening in the fuel tank, and its second region is integrally bonded to the outer wall of the fuel tank—for example, by welding a joining surface of the second region to the outer wall. The welding on of one or more fuel tank attachments according to the invention creates a fuel tank system.

In another aspect, the invention relates to a method of producing a fuel tank attachment.

In one embodiment of the invention, a joining surface of the first region is pre-treated before integral bonding so as to enhance the reactivity of the joining surface. This can be effected by a plasma treatment of the joining surface, for example, by means of a plasma jet, such as that known per se from EP 0 986 939 B1. The plasma treatment surprisingly not only enhances reactivity but also provides an improvement in compatibility, specifically by removing reaction-inhibiting layers that can adhere to the joining surface. Alternatively or additionally, a pretreatment of the joining surface can be effected by a plasma coating, flame treatment, chemical etching, or a mechanical pretreatment. The reactivity of the joining surface as enhanced by this type of pretreatment is especially advantageous for implementing the integral bond between the first and second components.

In one embodiment of the invention, the integral bond is generated by two-component or multi-component plastic injection molding. To this end, for example, the second component is created by injecting the blend into a mold. The mold is then opened for the purpose of pre-treating a joining surface of the second component—for example, by a plasma treatment or plasma coating. Subsequently, the first component is produced and integrally bonded to the second component by injecting the first plastic into the mold.

Embodiments of the invention are especially advantageous since the molding and joining of the first and second components, that is, for example, a tubular body element and a flange body, can be effected in an especially cost-effective manner.

Advantageously, at least one surface element, in particular, a joining surface, of the flange body can be coated by a plasma, after which the flange body with the plasma-treated surface element is joined in a fluid-tight manner to the annular body element. The coating operation saves material while at the same time enhancing adhesion.

The layer can be generated by two approaches:

In order to generate a first layer, a gas in a gas atmosphere can trigger a discharge that extracts ions from the flange body, atomizes them, accelerates them a short distance, which ions can be directed as a beam onto the surface element.

For this purpose, the discharge can be triggered as a gas from air or components of air, or from an inert gas, or inert gas and combinations thereof. The inert gas can be helium, neon, argon, krypton, xenon, radon, and mixtures and/or combinations thereof.

Components can be contained in a gas in a gas atmosphere that react in an open state with the surface element of the flange body and can form a second layer. In terms of the gas, components of an organic type can react in air for this purpose. However, components of an inorganic type can also react in air as the gas.

In both cases, a surface element of a flange body or the surface element of a plurality of flange bodies can be treated. Costs are reduced on a sustained basis due to the fact that the treatment can be effected in open conditions, that is, not under a vacuum.

To achieve an additional optimization in terms of material, for the tubular body element a body can first be molded out of a thermoplastic material that can be coated at least in part with a polyamide body. In an approach similar to hot-dip galvanization, the high-cost material is applied to a cost-effective one so as to exploit its predominantly positive properties.

The thermoplastic material body can be molded out of polyester, polyacetate, polyolefin, fluorothermoplastic, polyphenyl sulfide, or an inexpensive polyamide that has a relatively low fuel resistance.

The flange body can then be welded to the tank. Whether a neck fitting or blank flange or tank venting valve is considered, all of these components can be welded onto the tank over the openings forming a tight seal using the same approach at another location on the tank. As a result, the costs incurred in final assembly are reduced.

BRIEF DESCRIPTION OF THE DRAWINGS

Embodiments of the invention will be described in more detail with reference to the drawings. The invention is illustrated in the drawing and is described in more detail below. In the drawings.

DETAILED DESCRIPTION

Tanks for fuel have become increasingly complex in terms of their shape so as to provide the greatest possible volumetric capacity within confined spatial conditions. The shape varies considerably depending on the vehicle type. Fuel tank attachments, such as the neck fitting or valves, are therefore prefabricated individually in a separate process and only later mounted on the tank during final assembly. The tanks generally are composed of multiple layers, of which the outer wall 41 is composed of polyethylene.

Figure 1:
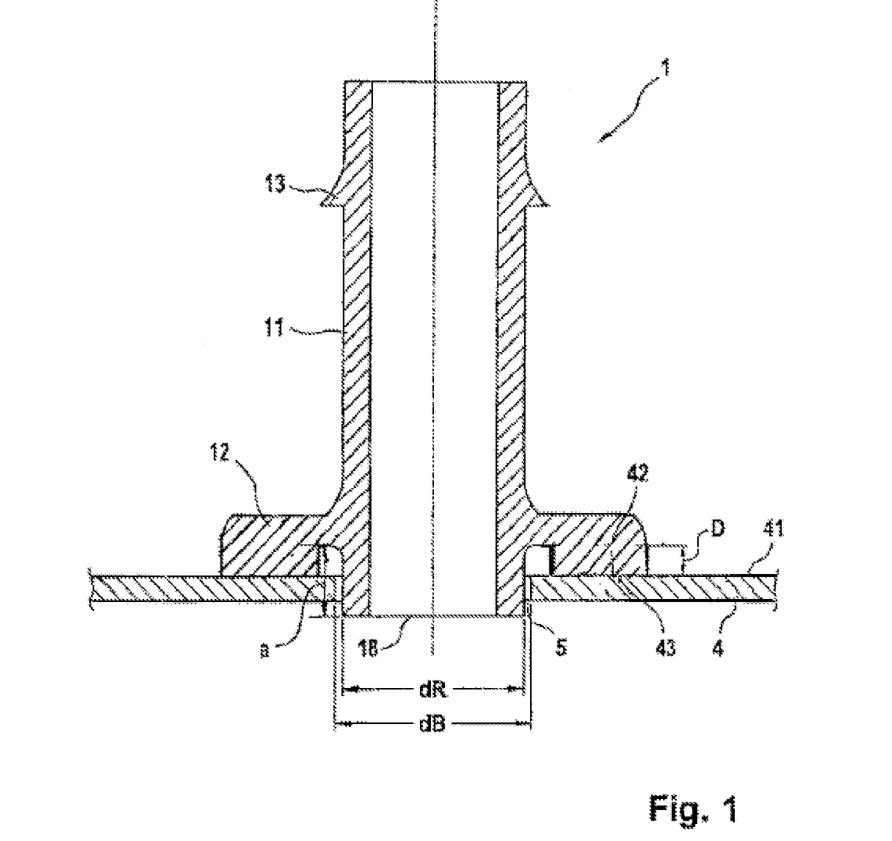
FIG. 1 is a schematic sectional view illustrating a component designed as a neck fitting and attached to a tank.

FIG. 1 shows a neck fitting 1 that has a tubular body element 11 including an annular body element 12.

Figure 3:
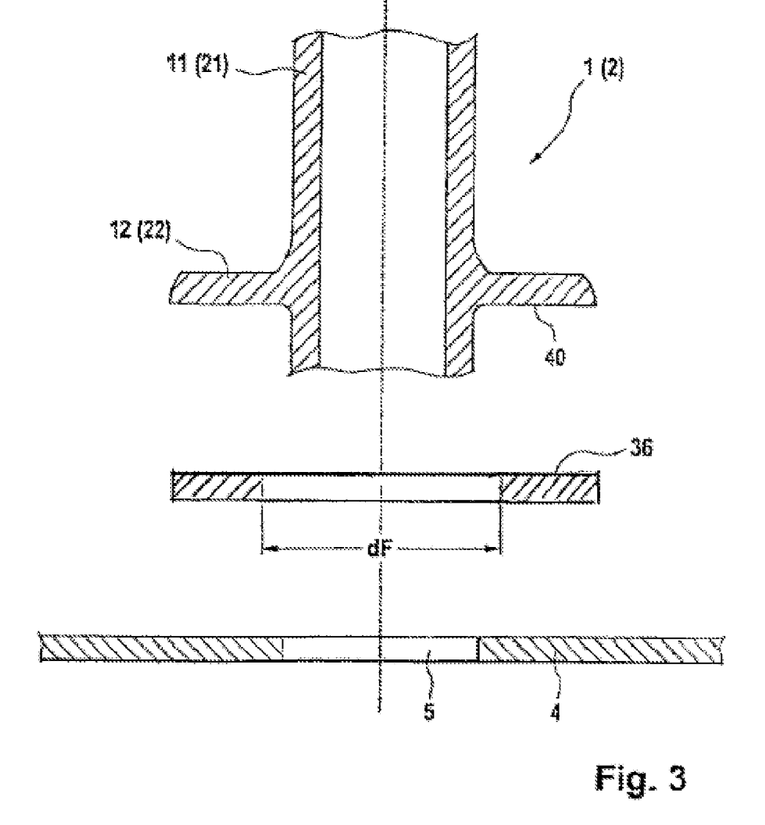
FIG. 3 provides a partial, schematic, disassembled, sectional view illustrating a first embodiment of an attachment of a tubular body element of a neck fitting as in FIG. 1 or tank venting valve as in FIG. 2.

Similar to an annular flange body, annular body element 12 of thickness D can be extended. Annular body element 12 is located over an opening 5 of tank 4. In the region of opening 5, annular body element 12 of tubular body element 11 is at a distance a from tubular outlet opening 18, which distance is greater than thickness D of the flange-body-shaped extension. As a result, tubular body element 11 projects into opening 5 of tank 4. In addition, an outer diameter dR of tubular body element 11 is approximately the same size as an inner diameter dB of the opening, yet smaller than an inner diameter dF of a flange-body-shaped extension 36 of annular body element 12 (see also 3). Located at the opposite end of tubular body element 11 is a connection unit with a circular retaining ridge 13.

Figure 2:
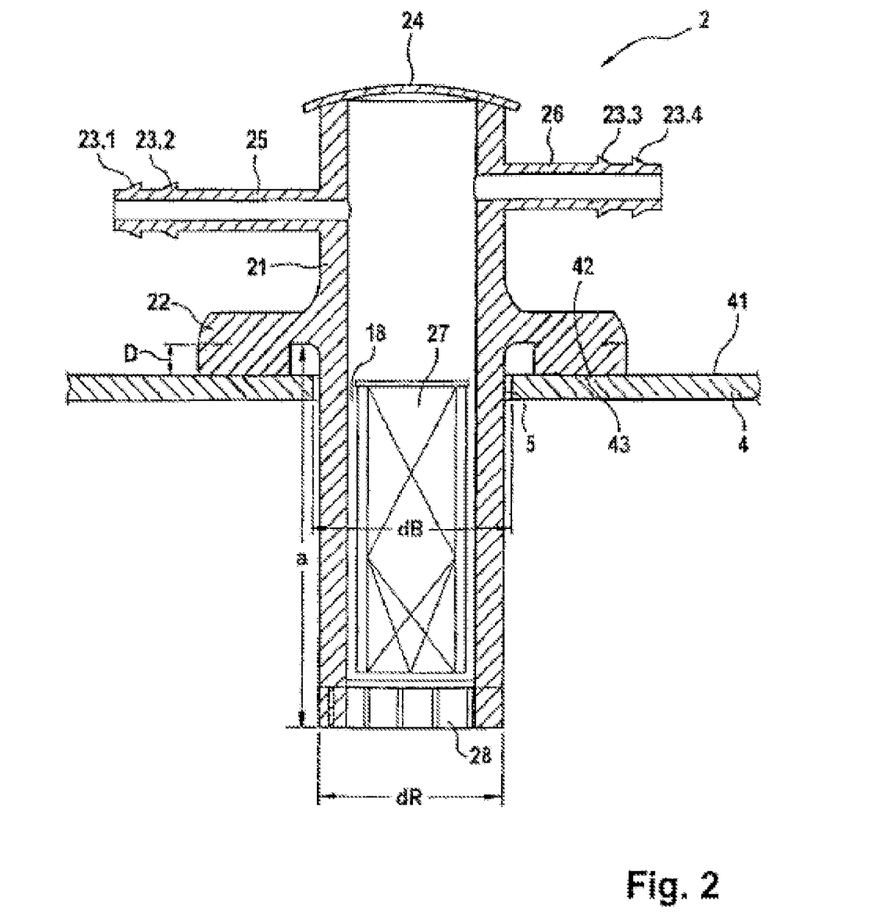
FIG. 2 is a schematic sectional view illustrating a component designed as a tank venting valve and attached to a tank.

A valve element 2 shown in FIG. 2 has a tubular body element 21 including an annular body element 22.

Flange-body-shaped extension 36 of annular flange body 3 of thickness D is also molded on below annular body element 22. Annular body element 22 is located above over opening 5 of tank 4. In the region of opening 5, annular body element 22 also is at a distance a from its end, this distance being significantly greater than thickness D of flange-body-shaped extension 36. As a result, tubular body element 21 projects far into opening 5 of tank 4. Tubular outlet openings 28 are disposed at the end of tubular body element 21. In addition, outer diameter dR of tubular body element 21 is approximately the same size as inner diameter dB of the opening, yet smaller than inner diameter dF of flange-body-shaped extension 36 (see also 3). The opposite end of tubular body element 21 is closed by a cap element 24. Connecting tubular elements 25 and 26 with at least one circular retaining ridge 23.1, 23.2, 23.3, 23.4 are disposed on tubular body element 21 below the cap element. A valve element 27 is disposed in this thus-prepared housing.

The problem now is to affix a fuel tank attachment in the form of neck fitting 1 or valve unit 2 including annular body elements 12, 22, hereafter referenced as components 12, over opening 5 onto tank 4.

Figure 4:
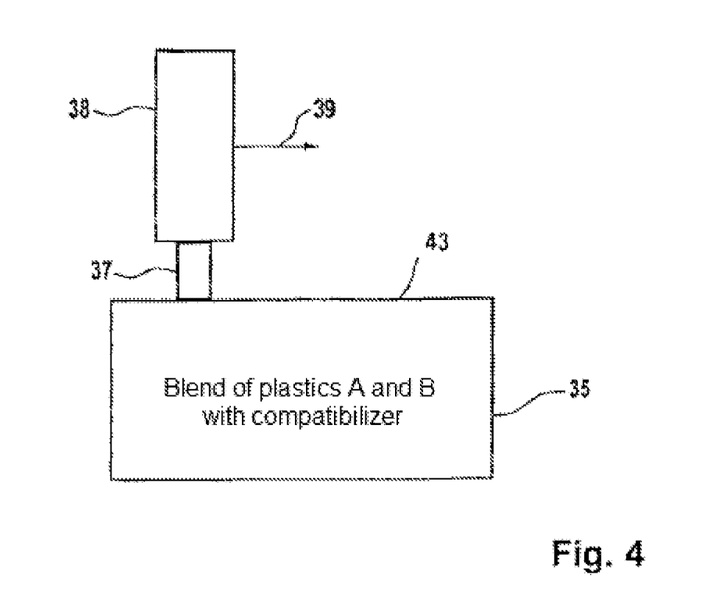
FIG. 4 is a schematic view illustrating embodiments of a first component and of a second component during a pretreatment before integral bonding.
Figure 5:
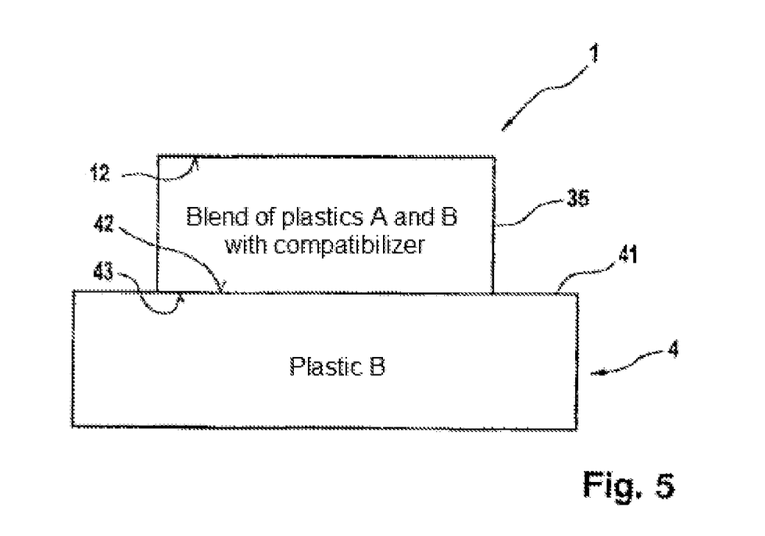
FIG. 5 is a schematic view illustrating embodiments of a fuel tank according to the invention comprising a fuel tank attachment.

FIG. 4 and FIG. 5 are schematic views illustrating embodiments of component 12 for fuel tank attachment 1. Component 12 is essentially composed of a blend 35 of a plastic A and a plastic B.

Plastic A is a fuel-resistant plastic, such as, e.g., polyamide, hereafter referenced as PA, in particular PA12, POM, or another fuel-resistant thermoplastic.

Plastic B is a non-fuel-resistant plastic that is immiscible with plastic A.

Plastic B is a polyethylene, hereafter referenced as PE, in particular High Density PE (HDPE), polypropylene (PP), or another thermoplastic, immiscible plastic material.

To render plastics A and B miscible, the blend contains a compatibilizer, such as, e.g., a copolymer of plastics A and B. If plastic A is PA and plastic B is PE, then this copolymer can be PEgPA (g=graft), i.e., a grafted copolymer or a copolymer generated reactively. The reactively generated copolymer is produced, for example, by providing the PE with a reactive group, e.g., with maleic anhydride or an acetic acid group, and by then enabling the thus grafted PE to form covalent bonds with the PA. However, a reverse approach is also possible where PA is grafted so as to then form covalent bonds with PE. Alternatively, the reaction can also be performed in a single stage, i.e., plastics A and B combine in one reaction step with each other, or by means of a single compatibilizer.

As the result of extensive testing, the blend 35 used has the following composition: approximately 45 wt. % polyamide as the first plastic; approximately 45 wt. % polyethylene as the second plastic; approximately 10 wt. % compatibilizer, additives, and fillers.

In order to produce an integral bond for a first embodiment of component 12 of fuel tank attachment 1 from blend 35, including outer wall 41 of fuel tank 4, which fuel tank attachment is essentially composed of plastic B, that is PE, one joining surface 42 here undergoes a pretreatment. The pretreatment is effected with a plasma 37. The plasma exits a plasma jet 38 in the direction indicated by arrow 38 [and is] moved along joining surface 42, thereby covering entire joining surface 42 and forming a plasma layer 43.

By applying plasma layer 43 to joining surface 42, the reactivity of the surface is enhanced. This facilitates formation of an integral bond between components 1 and 4.

Creating an integral bond in a second embodiment of component 12 of fuel tank attachment 1 from blend 35 including outer wall 41 of fuel tank 4 is possible as follows: Fuel tank 4 has an outer wall that is composed essentially of plastic B. Since blend 35, of which component 12 is composed, also contains plastic B, creating an integral bond between the two components 1 and 4 is possible. It is possible to eliminate this pre-treatment of joining surface 42, in particular, in such cases where, as mentioned above, the proportion of plastic B in the blend is greater than that of plastic A. In this case, an untreated joining surface 42 is thus present.

The production and attachment of the component in the form of neck fitting 1 in FIG. 1, or the component in the form of tank venting valve 2 in FIG. 2, is described with reference to FIGS. 3 through 5.

In the region of tubular body element 11, 21, neck fitting 1 of FIG. 1 and value unit 2 of FIG. 2 and annular body element 12, 22 are all of similar design. The annular body element emerges here in spout-like fashion from the tubular body element. The bottom surface element of the annular body element is essentially flat. The outer transitions are rounded, while the inner wall is continuous and smooth.

Tubular body element 11, 21 and annular body element 12, 22 are molded by injection molding out of blend 35 of PE and PA, together with reactively generated PEgPA copolymer as the compatibilizer, preferably by means of single-component injection molding of the blend. Blend 35 can include additives, such as lubricants, metallic pigment, and the like, such as, e.g., reinforcing agents, in particular, glass fibers (see FIGS. 4 and 5).

The joining surface of annular body element 12, 22 can be provided as untreated joining surface 42, or treated joining surface 43.

The treatment of joining surface 43 is effected by an activation, e.g., plasma treatment or a plasma coating. The thickness of the layer can be approximately 0.001 μm up to 100 μm.

In order to provide an integral bond: outer wall 41 of tank 4 composed of PE including annular body element 12, 22, composed of blend 35 of PE and PA including the reactively generated PEgPA copolymer as the compatibilizer, the following possible approaches exist: annular body element 12, 22 has untreated joining surface 42; annular body element 12, 22 has treated joining surface 43; annular body element 12, 22 is ex-tended by flange-body-shaped extension 36 (see also 3) and has untreated joining surface 42; and annular body element 12, 22 is extended by flange-body-shaped extension 36 (see also 3) and has treated joining surface 43.

With neck fitting 1, tubular body element 11 terminates in circular retaining ridge 13. Opposite end 28 is of just sufficient length from the bottom edge of the flange body element that it is able to extend a short way beyond the inner wall of tank 4 into the tank.

With tank venting valve 2, on the other hand, tubular body element 21 is closed by cap element 24. Connecting tubular elements 25, 26 with retaining ridges 23.1, . . . , 23.4 are molded onto tubular body element 21 below the cap element. The end of tubular body element 21 opposite cap element 24 is of sufficient length that it is able to project far into the tank and can accommodate the valve element 27 in its interior. In order to enable gases to flow unobstructed into the valve element, tubular outlet openings 28 are molded in.

Surface element 42 now undergoes plasma treatment, thereby forming plasma layer 43.

The plasma is a blend of positive and negative charge carriers in relatively large concentration, neutral particles, and photons. The concentrations of positive ions and electrons here are sufficiently large that on average the charges over time compensate each other at every point. The plasma should be conceived of as a separate aggregate state.

In terms of the plasma generation (sputtering), a discharge is triggered in a gas atmosphere, e.g., air and its components, or in an inert-gas atmosphere, e.g., helium, neon, argon, krypton, xenon, radon, and combinations thereof. The ions are extracted from the plasma by the carrier, i.e., by surface element 43 of tubular body element 21, that is, the PE-PA blend, as the target, i.e., layer material that is thus sputtered. At the same time, ions are generated in the ion source and accelerated a short distance and directed as a beam onto the surface element. As a result, plasma layer 43 grows under open conditions.

It is also possible for components to be contained in a gas, in particular air, that react on the surface element in the open state and form plasma layer 43. The components can be either organic or inorganic.

Plasma layer 43 is thereby applied within the thickness range already mentioned of approximately 0.001 μm to 100 μm.

As a result, both neck fitting 1 and tank venting valve 2 are ready to be attached to tank 4.

Once at the place of use, neck fitting 1 and tank venting valve 2 are welded onto opening 4 provided for them on tank 4 composed of PE. Flange body element 12, 21, and outer wall 41 of tank 4 are attached to each other.

It is advantageous in terms of assembly that all components here are fabricated out of the same blend 35. Neck fitting 1 and tank venting valve 2 are joined to tank 4 in a fluid-tight manner due to their shape and the blend of plastics 35 employed.

The volumetric expansion indices $$PE < PE/PA$$

are selected such that the integral bonds reliably withstand any possible swelling since it is possible for swelling to occur—if only to a small degree—even in a fuel-resistant plastic.

The invention claimed is:

1. A fuel tank attachment, comprising:
a neck, a tubular body element extending from the neck, and an annular flange element co-axially extending from the tubular body, integrally formed from a blend of a first plastic (A) and a second plastic (B), wherein:
the first and second plastics are not miscible,
the blend contains a compatibilizer to render the first and second plastics miscible,
the first plastic is a fuel-resistant plastic,
the second plastic is a non-fuel-resistant plastic, and
the fuel tank attachment is molded as a non-layered, single piece from the blend.

2. The fuel tank attachment according to claim 1, wherein the compatibilizer is a copolymer of the first and second plastics, wherein a proportion of the copolymer (AB) in the blend is one of: (i) a maximum of 30 wt. %, and (ii) a maximum of 15 wt. %.

3. The fuel tank attachment according to claim 2, wherein the copolymer is a graft copolymer.

4. The fuel tank attachment according to claim 1, wherein the first plastic is a polyamide (PA).

5. The fuel tank attachment according to claim 1, wherein the second plastic is a polyethylene (PE).

6. The fuel tank attachment according to claim 1, wherein a proportion of the first plastic in the blend is lower than a proportion of the second plastic, wherein the proportion of the first plastic is one of: (i) a maximum of 40 wt. %, and (ii) within a range between 20 wt. % and 30 wt. %.

7. The fuel tank attachment according to claim 1, wherein in a first region the fuel tank attachment has an integral bond with a second region, wherein the second region is located on an outer wall of a fuel tank, wherein the second region has the second plastic.

8. The fuel tank attachment according to claim 7, wherein the first region is provided so as to have an integral bond with the second region through a joining surface, wherein the second region is located on an outer wall of the fuel tank.

9. The fuel tank attachment according to claim 1, wherein the blend includes:
10 to 85 wt. % of the first fuel-resistant plastic;
85 to 10 wt. % of the second non-fuel-resistant plastic;
3 to 15 wt. % of the compatibilizer; and
approximately 5 to 30 wt. % in additives and fillers.

10. The fuel tank attachment according to claim 1, wherein the blend includes:
approximately 45 wt. % of the first fuel-resistant plastic;
approximately 45 wt. % of the second non-fuel-resistant plastic;
approximately 10 wt. % of the compatibilizer, additives, and fillers.

11. The fuel tank attachment according to claim 1, for attachment to an opening of tank composed of polyethylene that has at least one tubular body element including annular body element disposed thereon;

where the tubular body element and the annular body element can be produced from the blend as one piece, thereby enabling the copolymer annular body element to be attached by a surface element to the outer wall of the fuel tank.

12. A fuel tank attachment for a motor-vehicle fuel tank, comprising:

a neck, a tubular body element extending from the neck, and an annular flange element co-axially extending from the tubular body and is integrally bonded to an outer wall of the fuel tank, wherein:

the fuel tank attachment is integrally formed from a blend of a first plastic (A) and second plastic (B), the first and second plastics are immiscible, the blend contains a compatibilizer to render the first and second plastics miscible, the compatibilizer being a graft copolymer, the first plastic is a fuel-resistant plastic formed from a polyamide (PA) taken from the group consisting of PA6, PA66, PA11, PA12, and PA-T, the second plastic is a non-fuel-resistant plastic formed from polyethylene (PE), the blend contains approximately 45 wt. % of the first plastic, approximately 45 wt. % of the second plastic, and approximately 10 wt.% of the compatibilizer, additives, and fillers, and the fuel tank attachment is molded as a non-layered, single piece from the blend.

13. A method of producing a fuel tank attachment, comprising the following steps:

producing a component from a blend of a first plastic with a second plastic where the first and second plastics are not miscible, wherein the blend contains a compatibilizer so as to render the first and second plastics miscible, wherein the first plastic is a fuel-resistant plastic and the second plastic is non-fuel-resistant, the component having a neck, a tubular body element extending from the neck, and an annular flange element co-axially extending from the tubular body, integrally formed from the first plastic and the second plastic; and integrally bonding the component with a wall of a fuel tank such that the fuel tank attachment is molded as a non-layered, single piece from the blend.

14. The method according to claim 13, wherein the compatibilizer is a copolymer of the first and the second plastic, wherein the copolymer is a graft copolymer, and wherein the second plastic is grafted to produce the graft copolymer so as to then form covalent bonds with the first plastic.

15. The method according to claim 13, wherein a joining surface of the component undergoes a pretreatment before effecting the integral bonding.

16. The method according to claim 15, wherein the pretreatment comprises one or more of the following measures:

plasma treatment plasma coating, flame treatment, chemical etching, and mechanical roughening.

17. The method according to claim 13, wherein the integral bonding of the first and second components is effected by welding.

18. The method according to claim 13, wherein the fuel tank attachment is produced by a single-component plastic injection-molding process whereby the blend is injected into a mold.

19. The method according to claim 13, wherein an additional compatibilizer is used to produce the copolymer, the additional compatibilizer being added in solid or liquid form to a blend of the first plastic and the second plastic, and being at least partially consumed during copolymerization.

20. The method according to claim 19, wherein the additional compatibilizer contains reactive isocyanate groups and/or oligomers with epoxide groups and/or (maleic) anhydride groups or oxazoline groups.

21. The fuel tank attachment according to claim 4, wherein the polyamide (PA) is taken from the group consisting of PA6, PA66, PA11, PA12, and PA-T.

22. The fuel tank attachment according to claim 1, wherein the second plastic is a polypropylene (PP).

* * * * *